June 22, 1965   J. R. SINGER   3,191,119
APPARATUS FOR MEASURING FLOW USING MAGNETIC RESONANCE
Filed June 5, 1962
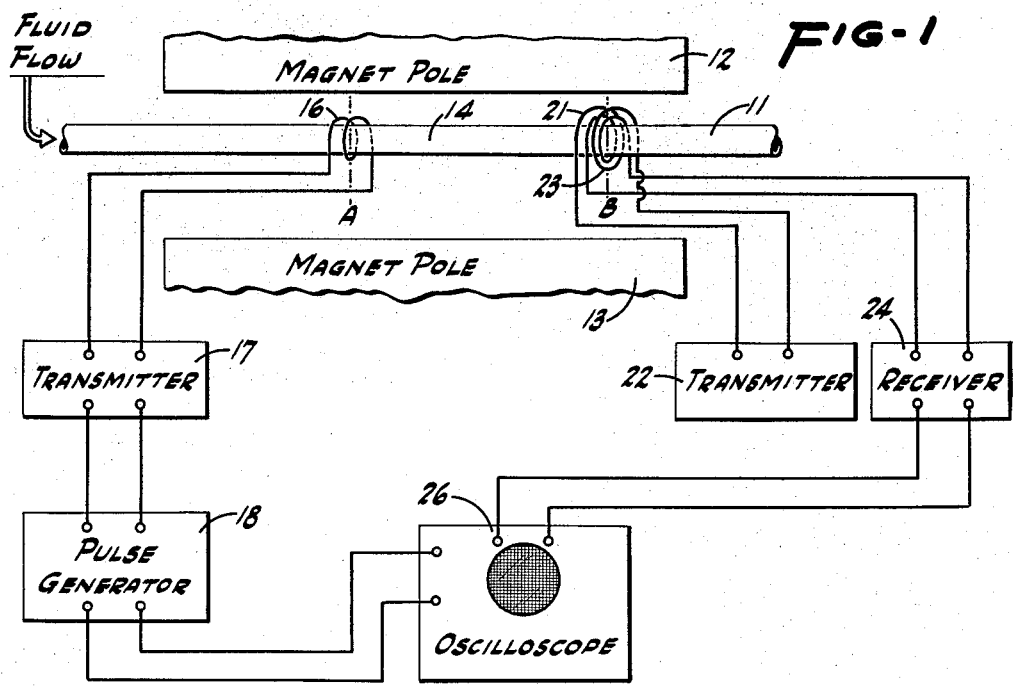
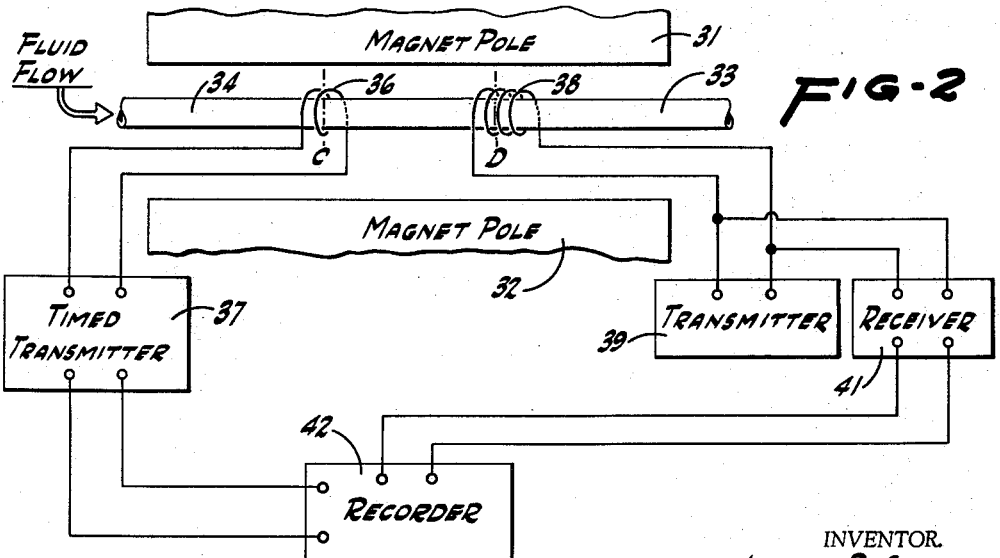
INVENTOR.
JEROME R. SINGER
BY
Lippincott, Ralph & Hendrickson
ATTORNEYS

United States Patent Office 3,191,119
Patented June 22, 1965

3,191,119
APPARATUS FOR MEASURING FLOW USING
MAGNETIC RESONANCE
Jerome R. Singer, 17 El Camino Road, Berkeley, Calif.
Filed June 5, 1962, Ser. No. 200,115
3 Claims. (Cl. 324—.5)

This application is a continuation-in-part of my copending application Serial No. 823,656, filed June 29, 1959, and now abandoned.

The present invention relates to a method and apparatus for measuring the flow of materials, and in accordance herewith, the flow rate of materials may be determined without access to the interior of the flow conduit.

The present invention is capable of measuring the flow rates of oil, blood, water, and most fluids by the utilization of nuclear magnetic resonance or electron magnetic resonance. The principle of nuclear magnetic resonance was discovered in 1946 by Professors F. Bloch and E. M. Purcell, for which they subsequently received the Nobel Prize. Reference is made to articles appearing in "Physical Review," 1946, vol. 70, pages 460 and 474, as well as "Physical Review," 1948, vol. 73, page 697. Although nuclear magnetic resonance has been widely employed since the date of its original identification, such applications have commonly been directed to technical investigations of the properties of materials, the identification of materials, or the precise measurement of magnetic field strengths. The present invention provides an application of nuclear magnetic resonance principles to the measurement of flow rates. More specifically, the present invention provides an improvement in available accuracy of flow rate determinations employing nuclear magnetic resonance, and also to a simplification of steps and apparatus associated therewith.

The principles of nuclear magnetic resonance have been widely investigated and the reports of such investigations published, and it is known that many materials exhibit magnetic resonance. Electron paramagnetic resonance (EPR), resulting from the magnetic moment of electrons, and nuclear magnetic resonance, resulting from net magnetic moments of nuclei of atoms, may be observed in most materials. Either one of the foregoing may be employed herein and it is noted that NMR utilizes a lower frequency, as of the order of 30 mc., while EPR is usually observed in the microwave range. Further, tracer materials, exhibiting known NMR characteristics for example, may be employed herewith if desired. Regarding NMR, it is briefly noted that the nuclei interact with external magnetic fields and because of their spins and magnetic moments precess at an angular frequency determined by the strength of the external magnetic field and their particular gyromagnetic ratio. For a given type of nuclei, the gyromagnetic ratio is a constant and the precession frequency is proportional to the external field. The positioning of a material in an external magnetic field results in a continuance of nuclear precession until the nuclei become aligned with this external field. It is also known that excitation of nuclei by another crossed magnetic field alternating at the precessional frequency thereof, results in absorption of energy by the nuclei from this field. The application of this excitation energy at a more rapid rate than that of dissipation by relaxation losses, results in a reorientation of the nuclei such as the alignment of nuclei against the steady field.

The present invention employs the phenomena of nuclear magnetic resonance or electron paramagnetic resonance, as known in the art and briefly described above, to measure the rate of flow of materials in a conduit without access to the interior of the conduit. This application is highly advantageous in many circumstances, such as for example, in the measurement of blood flow in human beings. Similarly, the invention is applicable to the measurement of flow rates of chemicals, for example, or any other material passing through some type of conduit which does not readily admit of access to the interior thereof.

The present invention, in brief, provides for the establishment of a steady magnetic field through which material flows. At one point in this field, high frequency energy is applied to the material at an appropriate frequency to cause resonant absorption. This applied energy is limited to very short pulses, and the relatively small quantity of material excited thereby is detected downstream yet within the steady magnetic field by the differing electrical characteristics of such an excited portion of the flowing material. Detection may be accomplished by noting the reduction in energy absorption of the material passing a predetermined point downstream. As regards the frequency of excitation energy, it is noted that same may be determined from the relationship $f=\gamma H/2\pi$, wherein $f$ is the frequency; gamma is the gyromagnetic ratio of the nucleus; and H is the strength of the steady magnetic field. Particular note is made that the present invention does not require any measurement of amplitudes of energy either applied or absorbed, and consequently, overcomes one of the serious difficulties of the prior art in the field of nuclear magnetic resonance. It is well recognized that relatively small electrical signals are available from this phenomena and that, consequently, precision method of measuring amplitudes involve complexities of apparatus precluding wide spread commercial applicability thereof. Despite the relative simplicity of the method and apparatus of the present invention, there is attained an accuracy within one percent or better.

It is an object of the present invention to accurately measure the flow of fluid in conduits without access to the interior of the conduit.

Another object of the present invention is to provide an improved biomedical tool for the precise measurement of blood flow rates in humans and animals.

Yet another object of the present invention is to provide an improved method and apparatus for measuring flow rates employing nuclear and electron paramagnetic resonance.

Various other objects and advantages of the present invention will become apparent to those skilled in the art from the following description of preferred steps of this invention and particular preferred embodiments of the apparatus hereof. The above-noted apparatus is illustrated in the accompanying drawings, wherein:

FIGURE 1 is a schematic illustration of apparatus and circuitry for measuring flow rates by nuclear induction; and FIGURE 2 is a schematic illustration of a system for measuring flow rates by nuclear absorption.

Considering now the method of the present invention, particularly in the light of the previous general discussion of nuclear magnetic resonance, it is provided herein that flowing materials such as a fluid shall be passed through a uniform magnetic field for polarizing the fluid. The nuclei of this polarized fluid is then excited by the application of a pulsed radio frequency signal of appropriate frequency to reorient some or all of the nuclei of the fluid. Downstream from the above noted location of excitation, there is detected the passage of excited nuclei, as for example, by noting the variation in absorption of resonant energy applied thereto at such second point. All of the foregoing is accomplished within the above noted steady state magnetic field, and the time elapsed between application of the excitation pulse and the detection of flowing fluid operated thereon then provides a measure of the fluid flow. By dividing this time by the distance between the point of excitation and point of detection, there is determined the flow rate.

Considering now the method of the present invention in somewhat greater detail, it is noted that the flowing fluid is polarized by a steady state magnetic field, and it is quite important that this field be held quite constant throughout the measurement area. Furthermore, it is necessary for the fluid to flow through the field for a sufficient period of time to properly orient the nuclei of the fluid. As regards the excitation of the fluid, same may be accomplished by saturation in which the nuclei are substantially entirely disoriented, by a 180 degree flip in which the nuclei are reversed in orientation in the steady state magnetic field or by an adiabatic fast passage. As these disoriented nuclei travel through the steady magnetic field, they precess to return back to the original direction of polarization and a measure of the time required for this return is known as the relaxation time. Relaxation times are characteristic of particular nuclei, and many prior art methods and apparatus have employed these characteristic relaxation times to obtain identification of the materials, for example. In the present invention, it is only necessary that the relaxation time be greater than the time of passage between the excitation and detection points of the material. Consequently, it will be appreciated to be necessary herein for the excitation and detection points to be relatively closely spaced with a sufficient velocity of fluid flow for measurements to be completed within the relaxation time. This does not impose an undue limitation upon the present invention, particularly when it is considered that the time characteristic for water is 2.3 seconds and for blood is about 0.5 second.

Detection of the small portions of fluid successively operated upon at the energization point, is accomplished by monitoring the fluid downstream from the excitation point. This monitoring may be accomplished by detecting variations in the absorption of excitation energy applied at the monitoring point. Quite clearly, partially saturated fluid passing the monitoring point will not absorb the same amount of excitation energy applied at the resonant frequency thereof as does wholly polarized fluid passing such point. There is, consequently, attained herein a succession of absorption variations at the detection point produced by corresponding successive energizing pulses applied at the excitation point. The time difference between excitation and detection is carefully determined, as for example, by a sweep oscilloscope having a very linear sweep, or even by the utilization of a precision stop watch. An accurate knowledge of the precise distance along the fluid flow path from the point of excitation to the point of detection then provides requisite information for determining velocity of flow. This velocity is equal to the time divided by the distance.

As noted above, the nuclei are excited by the application of energy at the resonant frequency thereof, and may either be saturated, i.e., wholly disoriented with regard to alignment, or may be flipped through 180 degrees so as to align themselves against the steady state magnetic field. The criteria for establishing these different conditions are known in the art. A particular example of precise steps employed in carrying out the method of the present invention is set forth below following a discussion of exemplary apparatus for fluid flow measurement by nuclear magnetic resonance. In addition to the direct determination of fluid flow velocity, it is also possible to provide a direct measurement of flow rate, i.e., quantity of fluid per unit time. Appropriate calibration of instruments to include the volume constant will, for example, provide this result. The method hereof may also be extended to successively trigger excitation pulses from detector output pulses and to count the number of such repetitions for some predetermined period. Inasmuch as individual excitation and detection occurs very rapidly herein, an averaging of a large plurality of individual readings may thus be readily obtained, so that flow rate is truly equal to the number of excitation pulses times the conduit volume between excitation and detection points divided by the total measured time.

There is illustrated in the accompanying drawing certain apparatus suitable for carrying out the present invention, and referring first to FIGURE 1 there will be seen to be illustrated a conduit 11, extending between a pair of magnet pole pieces 12 and 13. The conduit is preferably not ferromagnetic. A fluid 14 is passed through the conduit 11 in a direction as indicated by the arrows and legend in FIGURE 1. A constant and uniform magnetic field is established between the pole pieces 12 and 13, and nuclei of fluid 14 flowing through the conduit 11 between these pole pieces are thus polarized. The conduit extends for a sufficient distance through the uniform magnetic field for substantially complete polarization of the nuclei prior to excitation of such nuclei in accordance with the method hereof. At plane A within the magnetic field, there is disposed an excitation coil 16 which is electrically connected to an excitation source such as a transmitter 17. This transmitter 17, operating at a frequency proportional to the gyromagnetic ratio of the fluid 14 and the strength of the magnetic field through which the fluid flows, is controlled from a pulse generator 18 to thereby produce high frequency output pulses. The coil 16 is disposed to couple energy in the fluid with the magnetic component thereof lying in a plane perpendicular to the steady magnetic field and rotating thereabout at the precession frequency of the nuclei.

A short distance downstream from plane A along the conduit 11, provision is made for detecting the passage of fluid excited by high frequency pulses applied at A. These means include a first coil 21 at plane B coupled to the fluid in the conduit and energized at low power from a transmitter 22 operating at the resonant absorption frequency. Also at this detection plane B there is disposed a second coil 23 oriented in perpendicular relationship to the coil 21 and having leads extending to a receiver 24. This receiver 24 produces an output signal proportional to the energization thereof from the detection coil 23, and such signal may be employed to drive an oscilloscope 26 having the horizontal sweep thereof triggered by the pulse generator 18.

Considering now operation of the apparatus illustrated in FIGURE 1 and described above, a steady flow of fluid 14 through the conduit 11 between the pole pieces 12 and 13 will result in a polarization of the nuclei of the fluid. This polarization causes alignment of the nuclei along the lines of magnetic force. At plane A there is applied resonant excitation having a magnetic component rotating in a plane normal to the direction of the steady polarizing field. Short pulses of such exciting energy are coupled into the fluid at point A to thereby change the orientation of the nuclei. With the application of sufficient power, a saturated condition may be attained wherein substantially no organized alignment of the nuclei remain. Alternatively, the application of a lesser and predeterminal amount of power will cause a reversal of the direction of alignment, i.e., a 180 degree flip. As the fluid flows along the conduit 11 from plane A within the uniform magnetic field, the nuclei of the fluid precess at a rate characteristic of the fluid composition to thereby realign themselves in the magnetic field. The time required for a two thirds realignment is commonly termed the relaxation time. The present invention, however, does not depend upon relaxation times except that it is necessary to complete measurement within a time period less than this relaxation time. At plane B, downstream from the excitation plane A, it will thus be seen that a certain amount of reorientation of the nuclei will have occurred. At this point B, transmitter 22 energizes the coil 21 so as to return the nuclei to the condition achieved by the original excitation at point A. Clearly, only relatively low excitation power at point B is necessary for this return. Inasmuch as points A and B are separated an insufficient distance relative to the rate of fluid flow for the nuclei to have become entirely repolarized, it will then be seen that a small segment of fluid excited at A will upon reaching B absorb less energy for polarization than other fluid not excited at A. Receiver 24 receives some amount of energy coupled therein from the fluid, and this is proportional to the amount of energy absorbed by the fluid from the transmitter 22 through the coupling coil 21. As the excited, or at least partially excited, segment of flow passes B, the amount of energy absorbed by the fluid will decrease, and consequently, the receiver 24 will indicate this reduction in absorption. A change in the input to receiver 24 is employed to produce an output pulse applied herein to the oscilloscope 26. The pulse generator 18 serves to operate the horizontal sweep of the oscilloscope 26, and consequently, there will be depicted upon the screen of the scope a pulse occurring some indicated time after the application of the excitation pulse at A. The time between the excitation pulse at A and the change in absorption at B is thus the time of fluid flow between these points. From this information and a knowledge of the fixed distance between planes A and B, it will be appreciated that it is possible to readily calculate the velocity of flow. This velocity of flow equals the distance AB divided by the time between the application of the excitation pulse and the observable variation in energy absorption at point B.

The apparatus illustrated in FIGURE 1 and described above may be modified and varied in a multitude of respects. The magnetic field may, for example, be established by a permanent magnet, by an electromagnet, or in certain instances even by the earth's magnetic field. It is well known, as regards nuclear magnetic resonance, that uniformity of the magnetic field is quite important as regards accuracy, and consequently, even with permanent magnets it is advantageous to employ trimming coils or the like operated from suitable regulatory circuits, known in the art, to attain desired degrees of field uniformity. The circuitry employed in the various transmitters and generators illustrated in FIGURE 1 may be varied widely, and likewise the identity of the indicating apparatus illustrated as an oscilloscope is subject to variation. As noted above, it is a time measurement which is required so that, for example, timing circuits may be employed. In the instance wherein saturation of the nuclei is desired by the excitation at plane A, the length of the excitation pulse is not critical although it should, of course, be quite short. Under those circumstances wherein a 90 degree or 180 degree flip is desired, it is necessary to precisely limit the duration of the excitation pulse in relation to the magnetic field strength of the applied radio frequency energy. There may be employed a pulse length T determined from the relationship that $$T = \frac{\pi}{(\gamma H_1)}$$

wherein $\gamma$ is a constant of the material, and $H_1$ is the magnetic field strength of the applied radio frequency energy.

Physical mounting of the excitation coil 16 and coils 21 and 23 at the detection plane B is generally dictated by conventional electrical requirements. The coil 16 is oriented so as to establish a rotating magnetic field component in a plane perpendicular to the steady state magnetic field, and likewise the coil 23 is so oriented. This may be accomplished by disposing the coils about the conduit or by disposing portions of the coil on opposite sides thereof. Preferably the detection coil 23 is disposed with the axis thereof perpendicular to that of the coil 21 in order to reduce direct coupling between these coils. Inasmuch as no direct coupling is desired between the coils at the excitation and detection planes, suitable conventional steps may be taken to minimize this coupling.

There is illustrated in FIGURE 2 a modification of a flow measurement system in accordance with the present invention. In this embodiment of the invention, there are also provided a pair of spaced magnet pole pieces 31 and 32 establishing a constant homogeneous magnetic field H therebetween. A conduit 33 extends between these pole pieces in parallel relation to each and is adapted to carry the flow of a fluid 34 therethrough. Such fluid will be polarized by the steady state magnetic field H in passing through the left-hand portion of the conduit between the pole pieces, so as to orient the nuclei of the fluid. This fluid is excited, preferably to saturation, at a plane C within the steady state magnetic field by the application of periodic excitation tuned to the resonant absorption frequency of the nuclei. Such excitation may be accomplished by an excitation coil 36 coupled to the fluid within the conduit and energized through leads from a timed transmitter 37. The output of this transmitter 37 is tuned to the resonant absorption frequency of the nuclei and is pulsed to successively energize the excitation coil 36 with very short pulses of high frequency energy. This excitation is preferably accomplished at a sufficient power level to saturate the nuclei, i.e., to completely disorient same, so as to wholly overcome the polarization effects of the steady state magnetic field H. Only a short segment of flowing fluid is acted upon at a time, and as this segment passes through the conduit and reaches plane D the variation in nuclear polarization is detected thereat. It will be appreciated that this segment of fluid does have a different orientation of the nuclei from contiguous portions of the flowing fluid, under those conditions wherein the time of travel from plane C to plane D is less than the relaxation time of the nuclei. At plane D there is provided a coil 38 coupled to the fluid 34, as by disposition adjacent the conduit or about same, and this detection coil 38 is continuously energized from a low power transmitter 39.

As the segment of fluid acted upon or excited in the plane C passes along the conduit in the steady state magnetic field H, there will be produced a reorientation of the nuclei by precession of same, so that upon reaching the plane D this segment of fluid will have some partially oriented nuclei. Consequently, application at plane D of excitation energy at the resonant frequency of the nuclei will result in absorption of energy proportional to the amount of reorientation of the nuclei. Aside from the actual amount of energy absorption at point D, it will be apparent that there will be a different amount of energy absorbed by the previously excited segment of fluid than will be absorbed by unexcited portions of the fluid. Consequently, it is possible to readily detect the passage of this segment of fluid, and same is herein accomplished by the connection of a receiver 41 to the output of transmitter 39, so as to produce at this receiver a variation indicative of the change in absorption of fluid at plane D. Suitable rejection circuitry may be included in receiver 41 to prevent masking of the desired input variations.

The apparatus described above and illustrated in FIGURE 2 will thus be seen to operate upon a small segment of fluid flowing in the conduit, and to detect the passage of this segment downstream from the point of initial operation or excitation. The points of excitation and detection are displaced a known distance along the fluid flow path, and consequently, timing of the period elapsing between excitation and detection of corresponding segments of the fluid provides information from which the velocity of flow may be determined. In this embodiment of the invention, there is employed a recorder 42 connected to the receiver 41 and also through the timed excitation transmitter 37. While a variety of different recording instruments may be employed in the circuitry of FIGURE 2, it is advantageous to utilize, as a portion thereof, a time interval counter which operates continuously and a pulse counter indicating the number of output signals received from the receiver 41. As a further portion of this recorder, there may be included a pulse generator, or the like, producing output signals for each input signal and transmitting same to the timed transmitter 37 to time the operation of this latter unit. In this manner then, there is provided at recorder 42 a time indication as well as a count indication, so as to provide for obtaining an average flow time between planes C and D.

From a consideration of the foregoing, it will be apparent that a wide variety of different electronic circuits may be employed with the flow measurement hereof, so as to include varying degrees of complexity depending upon the desired results, and to attain any requisite circuit sophistication. There may also be employed magnetic field modulation to improve the signal-to-noise ratio, as is known in the art.

As an example of fluid flow measurement in accordance with the present invention, there is set forth the following example. An electromagnet with 8 inch diameter poles and a 2 inch gap was employed. In accordance with known techniques for improving signal-to-noise ratio in nuclear magnetic resonance measurements, the apparatus utilized in this example included two field modulation coils of fifty turns each of number 28 wire and 5 inches in diameter, placed in the magnet pole gap against the pole faces. A sixty cycle per second line frequency current adjustable from zero to one volt was supplied to these coils. The conduit was formed of two short sections of glass tubing, five millimeter outside diameter and three millimeter inside diameter, perpendicular to each other and about one centimeter apart in order to position them in the most uniform portion of the magnetic field. These two sections of conduit were joined by a section of flexible tubing with the same inside diameter. About each of the above-stated pieces of glass tubing, there was wound separate coils of number 28 magnet wirre. The excitation coil was formed with 18 turns and the pick-up coil with 13 turns. In this example water was employed as the fluid flowing in the conduit, and test measurements were made by utilizing a 200 milliliter pipette connected to the inlet hose and filled with water. Transmitting oscillators were separately connected to the excitation and pick-up coils, and these oscillators were both tuned to 20 megacycles. Following an initial warm-up period the oscillator amplitude and field sweep were adjusted for the best signal with the slowest flow to be measured and the excitation transmiter power and pulse width were adjusted initially for optimum observation.

As regards the modulation of the steady state magnetic field, it will be appreciated that this then serves to vary the resonant absorption frequency of the nuclei at twice the rate of the magnetic field variation, and in this example, the excitation transmitter was triggered by the output of the detection unit. A counter was attached to the detection unit as a part, for example, of the recorder illustrated in FIGURE 2, to produce a total count for 200 milliliters flow of fluid through the apparatus. With this particular physical setup, a large plurality of measurements, i.e., total counts for the flow of 200 milliliters of water through the apparatus, provided total count results varying from 203 to 205 after adequate initial warm up of the apparatus. It was determined that precision of flow measurement was obtained within plus or minus 0.75%. Investigation of this degree of error indicated that the pulsed transmitter of simple construction operating from an unregulated power supply was responsible for a major portion thereof, and in the absence of this source of error it was determined that the precision of 0.1% could be obtained. The foregoing example was repeated using denatured alcohol with no apparent difference in operation, except that a faster flow was necessary using the same coil configuration because of the shorter relaxation time of this fluid.

There is set forth above a brief description of an improved method of flow measurement equally applicable to nuclear magnetic resonance and electron paramagnetic resonance. There is also illustrated and described certain preferred apparatus suitable for carrying out this method. It is particularly noted, that the method hereof does not require the determination of amplitudes of signals. Conventional nuclear magnetic resonance measurements require the precise determination of signal amplitudes, however, the present invention overcomes the difficulties attendant such precise determinations of these extremely minute signals. Although it has been established that a variation of the order of 5% in the absorption of energy at the detection plane may be detected hereby, there is actually produced an accuracy of measurement much greater than 5%. Of particular note, as regards the applicability of the present invention, is the total lack of permanent or damaging effect upon the flowing fluid undergoing measurement. This is important in numerous applications including the measurement of blood flow. In this latter respect, it is additionally noted that highly successful measurements of blood flow in animals and humans have been carried out in accordance with the present invention.

What is claimed is:

1. Fluid flow apparatus comprising means establishing a substantially uniform magnetic field through a conduit carrying fluid, at least one transmitter, at least one coupling coil connected to said transmitter and adapted for disposition within said magnetic field adjacent said fluid-carrying conduit for coupling energy into flowing fluid at the magnetic resonance frequency thereof in said magnetic field, at least one receiver having coupling means adapted for disposition adjacent said conduit in said magnetic field downstream from said transmitter a fixed distance for producing a signal upon the passage of fluid resonantly excited by said transmittter energy, and recording apparatus connected to said transmitter and receiver and triggered by the transmitter output to establish a time base extending to the signal received by said receiver whereby the velocity of flow of fluid through said conduit is equal to the fixed distance between transmitter and receiver divided by said time base.

2. Fluid flow apparatus comprising means establishing a substantially uniform magnetic field through a conduit adapted to carry a fluid for measurement, at least one excitation coil disposed adjacent said conduit for periodically applying radio frequency energy of a resonant absorption frequency to disorient nuclei of fluid flowing in the conduit from the normal position thereof in said magnetic field, a high-frequency generator coupled to said excitation coil for energizing same, at least one detection coil disposed about said conduit a short, fixed distance downstream thereof from said excitation coil, means energizing at least one of said detection coils at the resonant absorption frequency of the fluid flowing in said conduit through said magnetic field, receiving means coupled to at least one of said detection coils and producing a signal upon a change in absorption of energy from said detection coil as caused by the passage of fluid thereby with at least partially disoriented nuclei resulting from the resonant excitation of same by said excitation coil, and means indicating the time between excitation and detection of nuclear resonance, whereby the division of said short, fixed distance between said excitation and detection coils by said time provides a fluid flow velocity in said conduit.

3. Flow measuring apparatus comprising means establishing a substantially uniform magnetic field through a conduit adapted to carry flowing fluid, first means generating pulsed signals of a frequency equal to the magnetic resonance of fluid in the conduit within the magnetic field, a first coil about said conduit in said field coupling said pulsed signals to fluid in the conduit, a second means generating a continuous signal of the same frequency as said pulsed signal, a second coil coupling said continuous signal to fluid in said conduit at a known distance from said first coil, receiving means tuned to said same frequency and coupled to pick up signals at the position of said second coil whereby such received signals are produced by the passage of fluid segments energized by said first coil, and means recording the time period between pulsed signals and corresponding received signals as a measure of fluid flow velocity.

References Cited by the Examiner
UNITED STATES PATENTS

| | | | |
|---|---|---|---|
| 2,640,936 | 6/53 | Pajes | 250—43.5 |
| 2,637,208 | 5/55 | Mellen | 73—194 |
| 2,721,970 | 10/55 | Levinthal | 324—0.5 |
| 2,780,069 | 2/57 | Olcott | 324—0.5 |
| 2,887,673 | 5/59 | Hahn | 324—0.5 X |

OTHER REFERENCES

Benoit: Academie Des Sciences, Comptes Rendus, volume 246, No. 20, May 28, 1958, pages 3053 to 3055 incl.

Hrynkiewicz: Arcives Des Sciences, volume 11, Colloque Ampere Edition, July 1958, pages 190 to 193 inclusive.

Blume: The Review of Scientific Instruments, vol. 30, No. 2, February 1959, pages 41 and 42.

Sherman: The Review of Scientific Instruments, volume 30, No. 7, July 1959, pages 568 to 575 inclusive.

Bowman et al.: I.R.E. Transactions on Medical Electronics, December 1959, pages 267 to 269 inclusive.

CHESTER L. JUSTUS, *Primary Examiner.*

MAYNARD R. WILBUR, *Examiner.*